(12) United States Patent
Kumakiri et al.

(10) Patent No.: US 10,386,838 B2
(45) Date of Patent: Aug. 20, 2019

(54) VEHICLE CONTROL DEVICE, VEHICLE CONTROL METHOD, AND VEHICLE CONTROL PROGRAM

(71) Applicant: HONDA MOTOR CO., LTD., Tokyo (JP)

(72) Inventors: Naotaka Kumakiri, Wako (JP); Kohei Okimoto, Wako (JP); Yoshitaka Mimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 15/614,980

(22) Filed: Jun. 6, 2017

(65) Prior Publication Data

US 2017/0351256 A1 Dec. 7, 2017

(30) Foreign Application Priority Data

Jun. 7, 2016 (JP) .................................. 2016-113883

(51) Int. Cl.
*G05D 1/00* (2006.01)
*B60R 16/023* (2006.01)
(Continued)

(52) U.S. Cl.
CPC ....... *G05D 1/0061* (2013.01); *B60R 16/0231* (2013.01); *B60W 40/064* (2013.01); *B60W 40/09* (2013.01)

(58) Field of Classification Search
CPC .. G05D 1/0061; B60W 10/20; B60W 30/182; B60W 50/082; B60W 50/085; B60W 2510/20; B60W 2710/202
See application file for complete search history.

(56) References Cited

U.S. PATENT DOCUMENTS

2014/0303827 A1* 10/2014 Dolgov ................. B60W 30/00
701/23
2015/0100191 A1* 4/2015 Yopp .................... B62D 15/025
701/23
(Continued)

FOREIGN PATENT DOCUMENTS

JP 2005-274484 A 10/2005
JP 2008-184004 A 8/2008
(Continued)

OTHER PUBLICATIONS

Office Action dated Mar. 20, 2018, issued in counterpart Japanese Application No. 2016-113883, with English machine translation. (6 pages).
(Continued)

*Primary Examiner* — Edwin A Young
(74) *Attorney, Agent, or Firm* — Westerman, Hattori, Daniels & Adrian, LLP

(57) ABSTRACT

A vehicle control device performs driving mode switching processing from an automated driving mode to a manual driving mode according to the intention of a vehicle occupant of a vehicle. A vehicle control device includes: a switching controller that is configured to switch a driving mode of a vehicle from an automated driving mode to a manual driving mode based on a predetermined manipulated variable of a steering wheel; and a steering reaction force setting unit that is configured to set, according to how a vehicle occupant grips the steering wheel, a steering reaction force applied when the vehicle occupant steers the steering wheel in the automated driving mode.

13 Claims, 9 Drawing Sheets

(51) Int. Cl.
*B60W 40/064* (2012.01)
*B60W 40/09* (2012.01)

(56) References Cited

U.S. PATENT DOCUMENTS

2016/0039428 A1* 2/2016 Odate ................. B60W 50/082
                                                          701/23
2016/0347314 A1* 12/2016 Kuwahara ........... B60W 30/182

FOREIGN PATENT DOCUMENTS

| JP | 2009-208682 A | 9/2009 |
| JP | 2013-180717 A | 9/2013 |
| JP | 2015-63244 A | 4/2015 |
| JP | 2015-89801 A | 5/2015 |
| JP | 2016-97873 A | 5/2016 |

OTHER PUBLICATIONS

Office Action dated Sep. 4, 2018, issued in counterpart Japanese Application No. 2016-113883, with English machine translation. (6 pages).

* cited by examiner

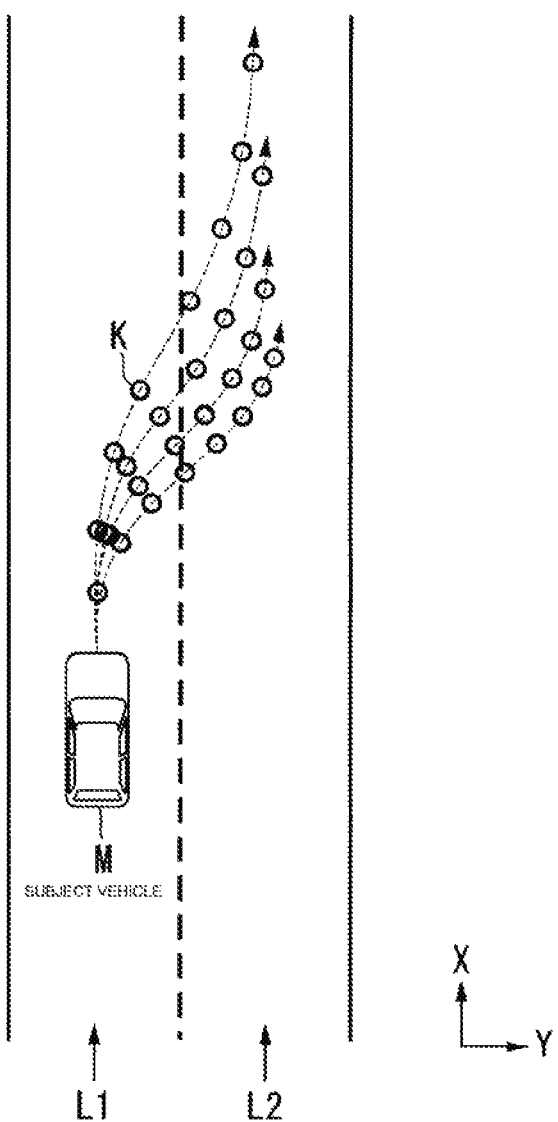

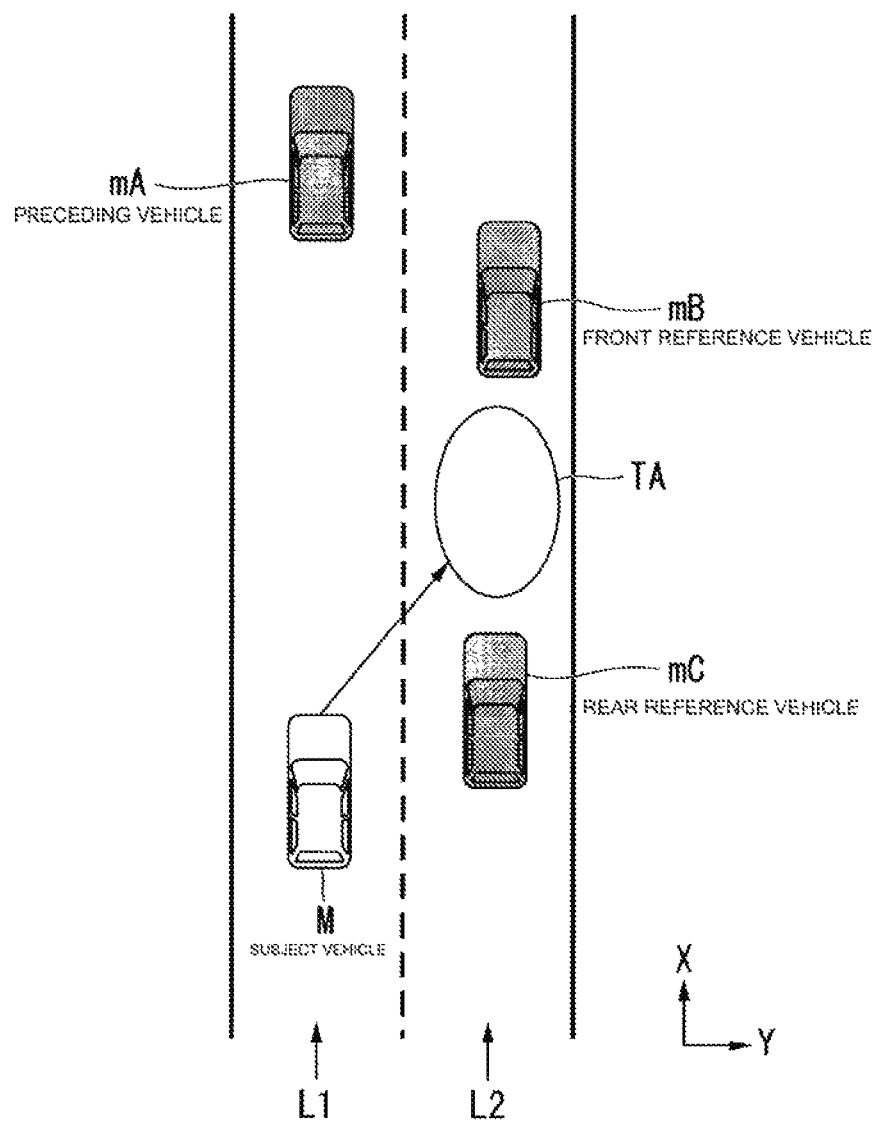

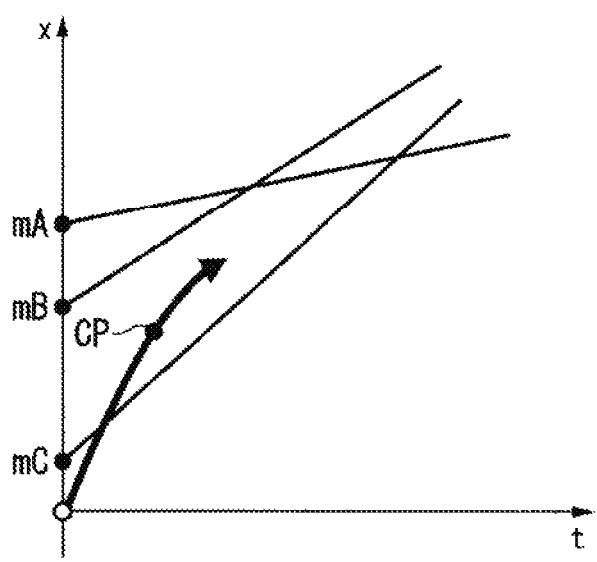

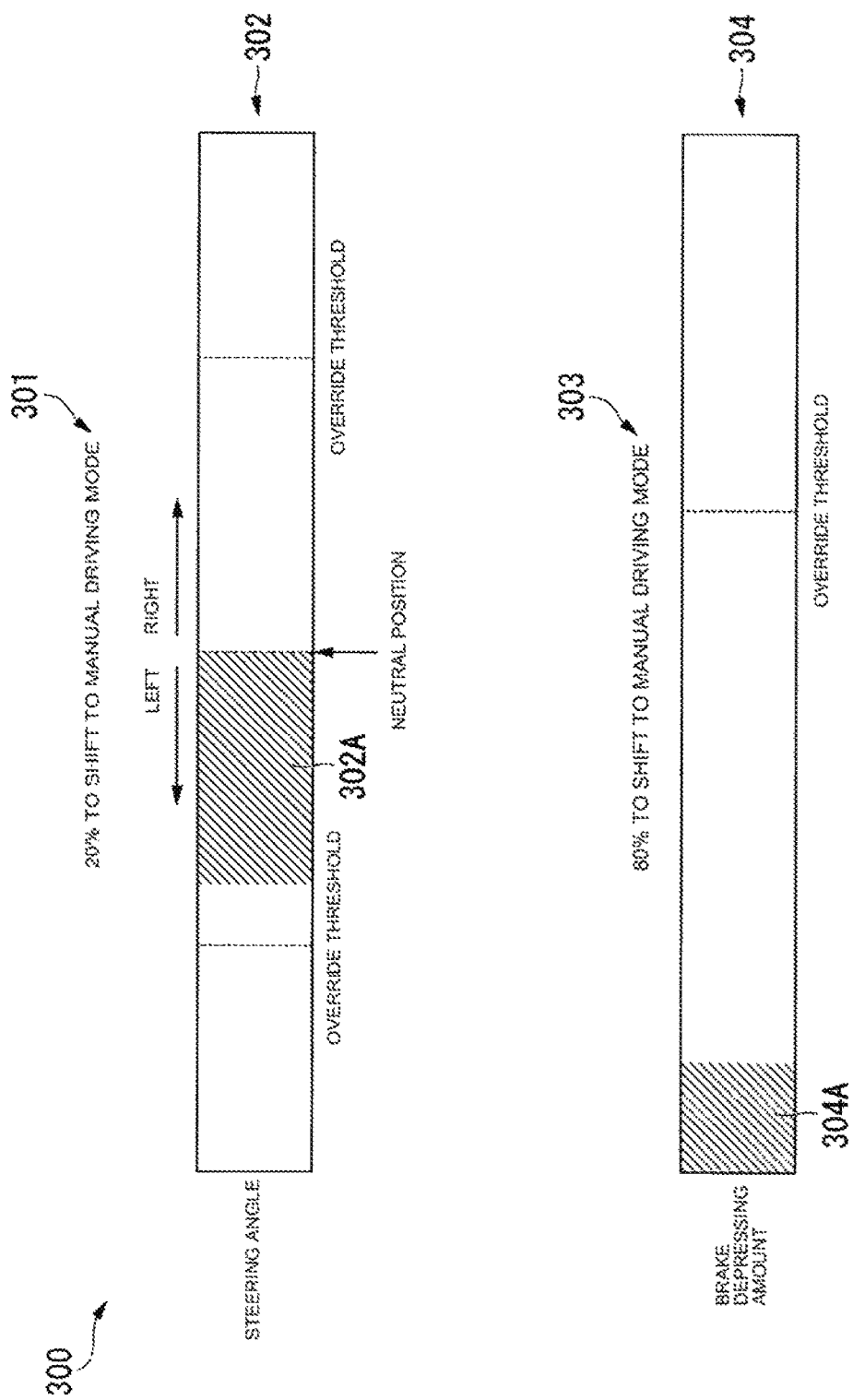

VEHICLE CONTROL DEVICE, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-113883, filed Jun. 7, 2016, entitled "Vehicle Control Device, Vehicle Control Method, and Vehicle Control Program." The contents of this application are incorporated herein by reference in their entirety.

TECHNICAL FIELD

The present disclosure relates to a vehicle control device, a vehicle control method, and a vehicle control program.

BACKGROUND

A study has recently been in progress as to automated driving mode technology for controlling at least steering of a vehicle so that the vehicle may travel along a target trajectory created based on a route to a destination.

Here, when the mode is changed from an automated driving mode to a manual driving mode where an occupant of the vehicle drives the vehicle by operating a steering wheel by himself/herself, control for changing the mode from the automated driving mode to the manual driving mode is sometimes performed based on the manipulated variable (manipulation amount) of the steering wheel (see Japanese Patent Application Publication No. 2015-63244, for example).

SUMMARY

However, in the automated driving mode, the steering wheel is sometimes operated when the vehicle occupant unwittingly touches the steering wheel. Depending on the manipulated variable of the steering wheel at this time, the mode might be switched from the automated driving mode to the manual driving mode although the vehicle occupant does not intend to cancel automated driving and perform manual driving.

It is desirable to provide a vehicle control device, a vehicle control method, and a vehicle control program with which processing for switching of the driving mode from the automated driving mode to the manual driving mode is performed according to the intension of a vehicle occupant of a vehicle.

The first aspect of the embodiments provides a vehicle control device (for example, a vehicle control device 100 and a steering reaction force setting unit 210M in an embodiment) including: a switching controller (for example, a switching controller 150 in the embodiment) that is configured to switch a driving mode of a vehicle from an automated driving mode to a manual driving mode based on a predetermined manipulated variable (manipulation amount) of a steering wheel; and a steering reaction force setting unit (for example, the steering reaction force setting unit 210M in the embodiment) that is configured to set, according to how a vehicle occupant grips the steering wheel, a steering reaction force applied when the vehicle occupant steers the steering wheel in the automated driving mode.

The second aspect provides a vehicle control device in which, according to a grip force with which the vehicle occupant grips the steering wheel, the steering reaction force setting unit sets the steering reaction force applied when the vehicle occupant steers the steering wheel in the automated driving mode.

The third aspect provides a vehicle control device in which the steering reaction force setting unit compares a predetermined first grip force threshold with the grip force, and changes the steering reaction force from a first steering reaction force to a second steering reaction force smaller than the first steering reaction force if the grip force exceeds the first grip force threshold.

The fourth aspect provides a vehicle control device in which, according to a grip position at which the vehicle occupant grips the steering wheel, the steering reaction force setting unit sets the steering reaction force applied when the vehicle occupant steers the steering wheel in the automated driving mode.

The fifth aspect provides a vehicle control device in which the steering reaction force setting unit compares a predetermined grip position with the grip position, and changes the steering reaction force from a first steering reaction force to a second steering reaction force smaller than the first steering reaction force if the grip position is located at the same position as or at a position near the predetermined grip position.

The sixth aspect provides a vehicle control device in which the steering reaction force setting unit determines the first grip force threshold or the grip position by studying the grip force or the grip position in the manual driving mode.

The seventh aspect provides a vehicle control method including: a switching control process of causing a switching controller to switch a driving mode of a vehicle from an automated driving mode to a manual driving mode based on a predetermined manipulated variable of a steering wheel; and a steering reaction force setting process of causing a steering reaction force setting unit to set, according to how a vehicle occupant grips the steering wheel, a steering reaction force applied when the vehicle occupant steers the steering wheel in the automated driving mode.

The eighth aspect provides a vehicle control program causing a computer to function as: switching control means for switching a driving mode of a vehicle from an automated driving mode to a manual driving mode based on a predetermined manipulated variable of a steering wheel; and steering reaction force setting means for setting, according to how a vehicle occupant grips the steering wheel, a steering reaction force applied when the vehicle occupant steers the steering wheel in the automated driving mode. In the above explanation of the exemplary embodiment, specific elements with their reference numerals are indicated by using brackets. These specific elements are presented as mere examples in order to facilitate understanding, and thus, should not be interpreted as any limitation to the accompanying claims.

According to the first, seventh and eighth aspects, the steering reaction force to be applied on the steering wheel is set according to how the vehicle occupant grips the steering wheel. Thus, the steering reaction force suitable for the driving mode intended by the vehicle occupant can be applied on the steering wheel. This makes it possible to set the steering reaction force strong enough to prevent the steering angle from being changed easily even when the vehicle occupant touches the steering wheel by mistake, and thereby prevent a situation where the operation of the vehicle occupant is judged as override even though the vehicle occupant has no intention of override.

According to the second aspect, the steering reaction force applied when the vehicle occupant steers the steering wheel in the automated driving mode is set according to the grip force with which the vehicle occupant grips the steering wheel. Thus, it is possible to apply the steering reaction force suitable for the driving mode intended by the vehicle occupant on the steering wheel by judging the driving mode intended by the vehicle occupant from the grip force of the steering wheel.

According to the third aspect, the first steering reaction force is set as the steering reaction force to be applied on the steering wheel if the grip force with which the vehicle occupant grips the steering wheel is equal to or smaller than the first grip force threshold, and the second steering reaction force is set as the steering reaction force if the grip force exceeds the first grip force threshold. Thus, it is possible to apply the steering reaction force suitable for the driving mode intended by the vehicle occupant on the steering wheel by judging the driving mode intended by the vehicle occupant based on whether or not the grip force of the steering wheel exceeds the threshold.

According to the fourth aspect, the steering reaction force applied when the vehicle occupant steers the steering wheel in the automated driving mode is set according to the grip position at which the vehicle occupant grips the steering wheel. Thus, it is possible to apply the steering reaction force suitable for the driving mode intended by the vehicle occupant on the steering wheel by judging the driving mode intended by the vehicle occupant from the grip position of the steering wheel.

According to the fifth aspect, the steering reaction force is changed from the first steering reaction force to the second steering reaction force smaller than the first steering reaction force if the grip position at which the vehicle occupant grips the steering wheel is located at the same position as or at a position near the predetermined grip position. Thus, it is possible to apply the steering reaction force suitable for the driving mode intended by the vehicle occupant on the steering wheel by judging the driving mode intended by the vehicle occupant based on whether or not the grip position of the steering wheel is located at the same position as or at a position near the predetermined grip position.

According to the sixth aspect, the device studies the grip force/the grip position using data on the grip force/the grip position with which/at which the vehicle occupant grips the steering wheel in the manual driving mode. Thus, it is possible to set the predetermined first grip force threshold or the grip position according to the driving characteristics of the vehicle occupant by studying the grip force or the grip position during the manual operation of the vehicle occupant.

BRIEF DESCRIPTION OF THE DRAWINGS

The advantages of the disclosure will become apparent in the following description taken in conjunction with the following drawings.

FIG. 8 is a view illustrating, with trajectory points K, trajectory candidates created by the trajectory candidate creation unit 146B.

FIG. 9 is a view illustrating a lane change target position TA.

FIG. 10 is a chart illustrating a velocity model created based on an assumption that the velocities of three peripheral vehicles are constant.

FIG. 11 is a chart illustrating comparison between the current manipulated variable and the override threshold corresponding to this manipulated variable which is displayed on a display screen 300 of a display device 91.

DETAILED DESCRIPTION

Hereinbelow, an embodiment of the vehicle control device, the vehicle control method, and the vehicle control program according to the present disclosure is described with reference to the drawings.

Figure 1:
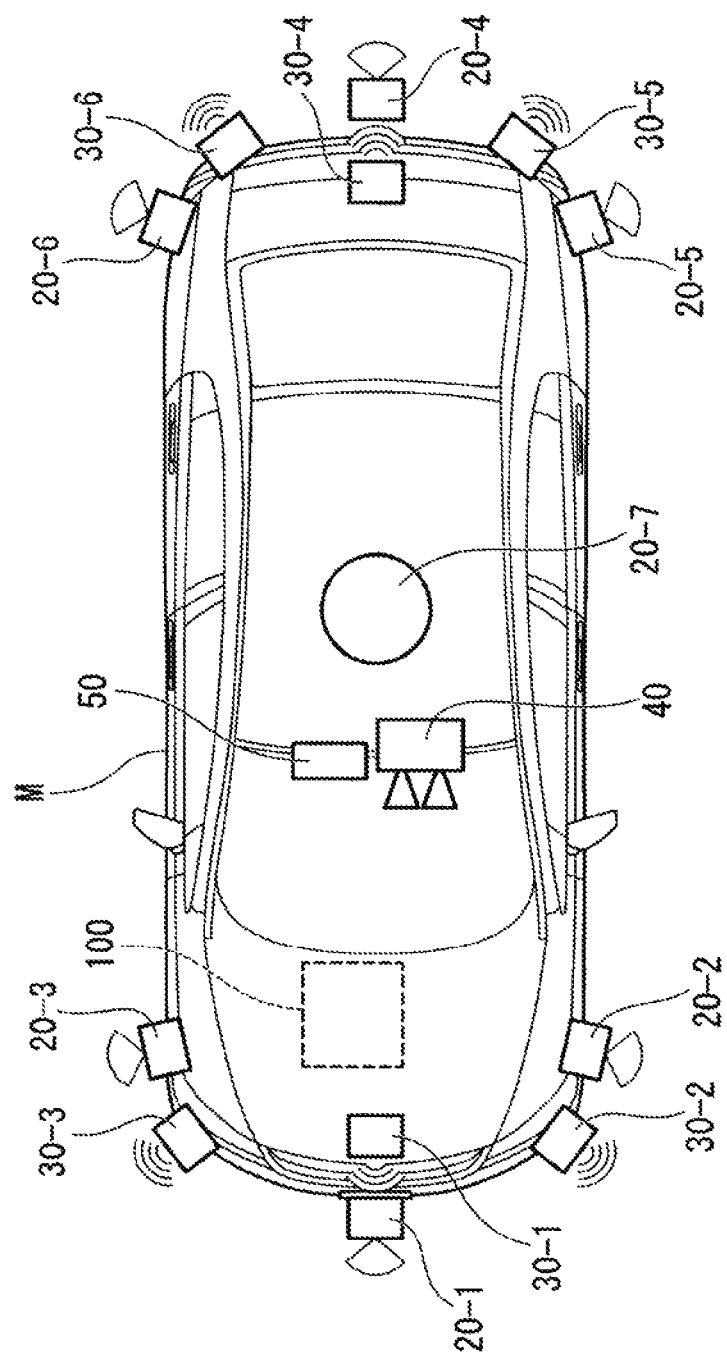
FIG. 1 is a view illustrating an example of constituents of a vehicle equipped with a vehicle control system 100 according to an embodiment of the present disclosure.

FIG. 1 is a view illustrating an example of constituents of a vehicle (hereinafter called a subject vehicle M) equipped with a vehicle control system 100 according to an embodiment of the present disclosure. The vehicle equipped with the vehicle control system 100 is a car such as a two-wheeled, three-wheeled, or a four-wheeled car, for example, and examples of such a car include: a car having an internal combustion engine such as a diesel engine or a gasoline engine as its power source; an electric vehicle having an electric motor as its power source; and a hybrid car having both an internal combustion engine and an electric motor. For example, the electric vehicle is driven by power discharged from a cell such as a secondary cell, a hydrogen fuel cell, a metal fuel cell, or an alcohol fuel cell.

As illustrated in FIG. 1, the subject vehicle M is equipped with: sensors including finders 20-1 to 20-7, radars 30-1 to 30-6, and a camera 40; a navigation system 50; and the vehicle control system 100. The sensors such as the finders 20-1 to 20-7, the radars 30-1 to 30-6, and the camera 40 constitute a detection device DD to be described later, for example.

For example, each of the finders 20-1 to 20-7 is a Light Detection and Ranging or a Laser Imaging Detection and Ranging (LIDAR) configured to measure a distance to a target by measuring scattered light from illumination light. For example, the finder 20-1 is attached to a location such as a front grille, and the finders 20-2 and 20-3 are attached to locations such as side faces of a vehicle body, outside rearview mirrors, the inside of head lights, or the vicinity of side lights. The finder 20-4 is attached to a location such as a trunk lid, and the finders 20-5 and 20-6 are attached to locations such as side faces of the vehicle body or the inside of tail lights. The finders 20-1 to 20-6 each have a horizontal detection range of about 150 degrees, for example. Meanwhile, the finder 20-7 is attached to a location such as a roof. The finder 20-7 has a horizontal detection range of 360 degrees, for example.

For example, the radars 30-1 and 30-4 are long-distance millimeter-wave radars whose depthwise detection range is wider than that of other radars. Meanwhile, the radars 30-2, 30-3, 30-5, and 30-6 are middle-distance millimeter-wave radars whose depthwise detection range is narrower than that of the radars 30-1 and 30-4.

Hereinbelow, the finders 20-1 to 20-7 are simply stated as the "finders 20" unless they should be particularly distinguished from one another, and the radars 30-1 to 30-6 are simply stated as the "radars 30" unless they should be particularly distinguished from one another. The radars 30 are configured to detect an object by the Frequency Modulated Continuous Wave (FM-CW) method, for example.

For example, the camera 40 is a digital camera using a solid-state image pick up device such as a Charge Coupled Device (CCD) or a Complementary Metal Oxide Semiconductor (CMOS). The camera 40 is disposed at a location such as an upper part of a front windshield or a rear face of an inside rearview mirror. The camera 40 is configured to take an image of an area in front of the subject vehicle M periodically and repeatedly, for example. The camera 40 may be a stereoscopic camera having more than one camera.

Note that the configuration illustrated in FIG. 1 is merely an exemplary configuration, and thus a part of the configuration may be omitted and another configuration may be added.

Figure 2:
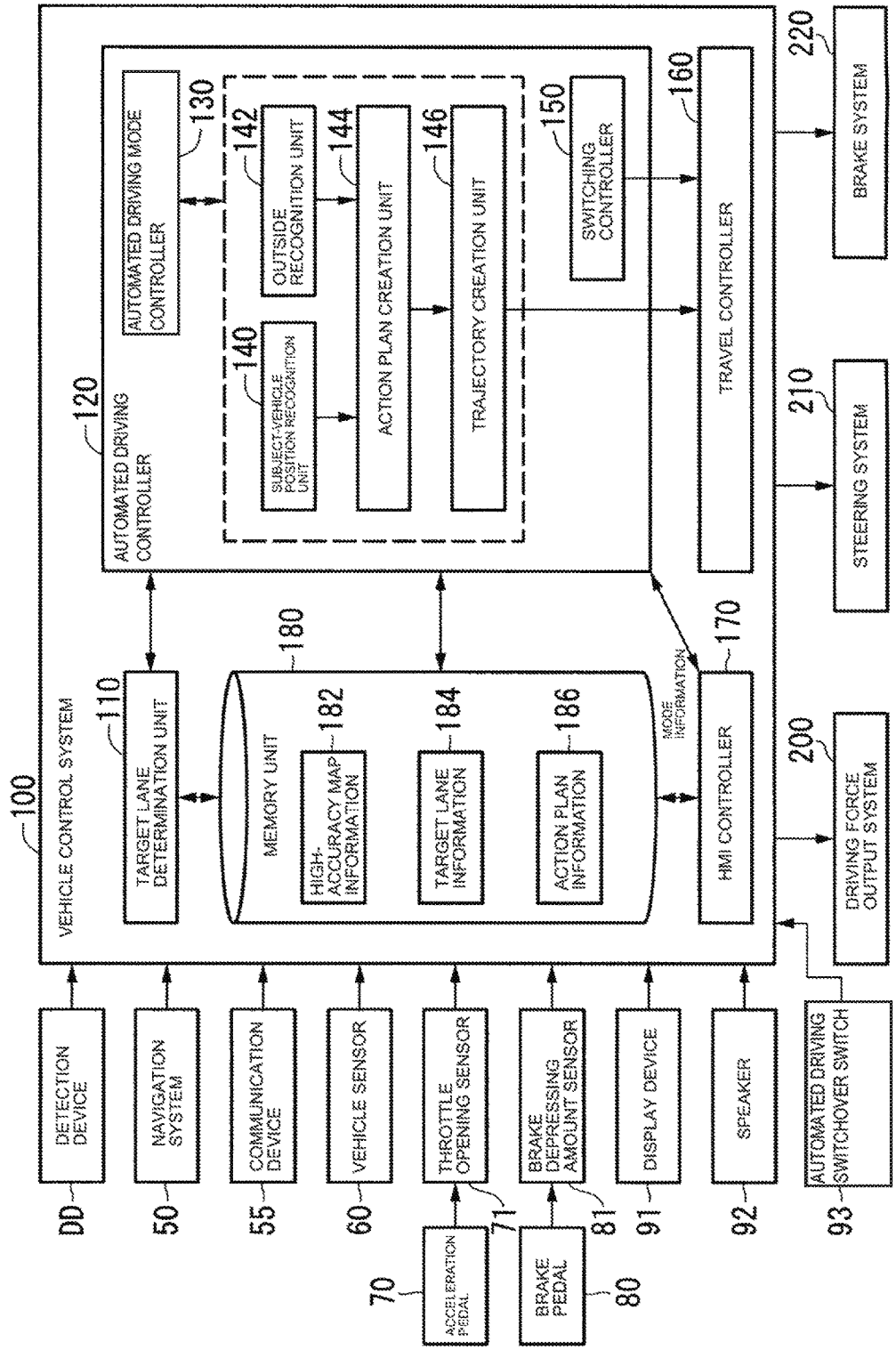
FIG. 2 is a functional block diagram of a subject vehicle M centered on the vehicle control system 100.

FIG. 2 is a functional block diagram centered on the vehicle control system 100 according to this embodiment. The subject vehicle M is equipped with: the detection device DD including the finders 20, the radars 30, the camera 40, and the like; the navigation system 50; a communication device 55; a vehicle sensor 60; an acceleration pedal 70; a throttle opening sensor 71; a brake pedal 80; a brake depressing amount sensor 81; a display device 91; a speaker 92; an automated driving switchover switch 93; the vehicle control system 100; a driving force output system 200; a steering system 210; and a brake system 220. These devices and instruments are connected to one another via a multiplex communication line such as a Controller Area Network (CAN) communication line, a serial communication line, a radio communication network, and the like. Note that the vehicle control device in the scope of claims does not necessarily indicate the "vehicle control system 100" only, but may include a configuration other than the vehicle control system 100 (such as the detection device DD).

The navigation system 50 has: a Global Navigation Satellite System (GNSS) receiver; map information (navigation map); a touch panel display device acting as a user interface; a speaker; a microphone; and the like. The navigation system 50 is configured to identify the position of the subject vehicle M with the GNSS receiver and derive a route from the identified position to a destination designated by a user. The route thus derived by the navigation system 50 is provided to a target lane determination unit 110 of the vehicle control system 100. The position of the subject vehicle M may be identified or complemented by the Inertial Navigation System (INS) that uses an output from the vehicle sensor 60. The navigation system 50 is also configured to guide the route to the destination by means of audio or navigation display. Here, the configuration for identifying the position of the subject vehicle M may be provided separately from the navigation system 50. In addition, the navigation system 50 may be implemented, for example, by the function of a terminal device such as a smartphone or a tablet terminal owned by the user. In this case, information is exchanged between the terminal device and the vehicle control system 100 through wired or wireless communication.

The communication device 55 is configured to perform radio communication using a cellular network, a Wi-Fi network, Bluetooth (registered trademark), and Dedicated Short Range Communication (DSRC), for example.

The vehicle sensor 60 includes sensors such as: a vehicle velocity sensor configured to detect a vehicle velocity; an acceleration sensor configured to detect acceleration; a yaw rate sensor configured to detect the angular velocity about the vertical axis; and a direction sensor configured to detect the direction of the subject vehicle M.

The acceleration pedal 70 is an operator for accepting acceleration instructions (or deceleration instructions along with a pedal release operation) from a vehicle occupant. The throttle opening sensor 72 is configured to detect the amount of depression of the acceleration pedal 70, and output a throttle opening signal, indicative of the amount of depression, to the vehicle control system 100. Here, the throttle opening sensor may output this signal to the driving force output system 200, the steering system 210, or the brake system 220 directly instead of outputting it to the vehicle control system 100. The same applies to the configuration of another driving operation system to be described below.

The brake pedal 80 is an operator for accepting deceleration instructions from the vehicle occupant. The brake depressing amount sensor 81 is configured to detect the amount of depression of the brake pedal 80 (or force with which the brake pedal is depressed), and output a brake signal, indicative of a detection result, to the vehicle control system 100.

The display device 91 is, for example, a display device such as a Liquid Crystal Display (LCD) or an organic Electroluminescence (EL) display device attached to a location such as parts of an instrument panel or any desired location opposite a passenger's seat and back seats. Alternatively, the display device 91 may be a Head Up Display (HUD) configured to project an image on a front windshield or another window. The speaker 83 is configured to output audio.

Before the description of the vehicle control system 100, the driving force output system 200, the steering system 210, and the brake system 220 are described.

[Driving Force Output System]

The driving force output system 200 is configured to output driving force (torque), generated for the vehicle to travel, to driving wheels. For example, in the case where the subject vehicle M is a car having an internal combustion engine as its power source, the driving force output system 200 includes an engine, a transmission, and an engine Electronic Control Unit (ECU) configured to control the engine; in the case where the subject vehicle M is an electric vehicle having an electric motor as its power source, the driving force output system includes a driving motor and a motor ECU configured to control the driving motor; and in the case where the subject vehicle M is a hybrid car, the driving force output system includes an engine, a transmission, an engine ECU, a driving motor, and a motor ECU. In the case where the driving force output system 200 includes the engine only, the engine ECU adjusts parameters such as the throttle opening of the engine and the shift stage according to information input from a travel controller 160 to be described below. In the case where the driving force output system 200 includes the driving motor only, the motor ECU adjusts the duty ratio of a PWM signal to be fed to the driving motor according to information input from the travel controller 160. In the case where the driving force output system 200 includes both the engine and the driving motor, the engine ECU and the motor ECU control the driving force in concert with each other according to information input from the travel controller 160.

[Steering System]

The steering system 210 includes a steering ECU and an electric motor, for example. The electric motor is configured to change the direction of steered wheels by applying force to a rack and pinion mechanism, for example. The steering ECU is configured to drive the electric motor to change the direction of the steered wheels according to information input from the vehicle control system 100 or input information on steering angle or steering torque.

Figure 3:
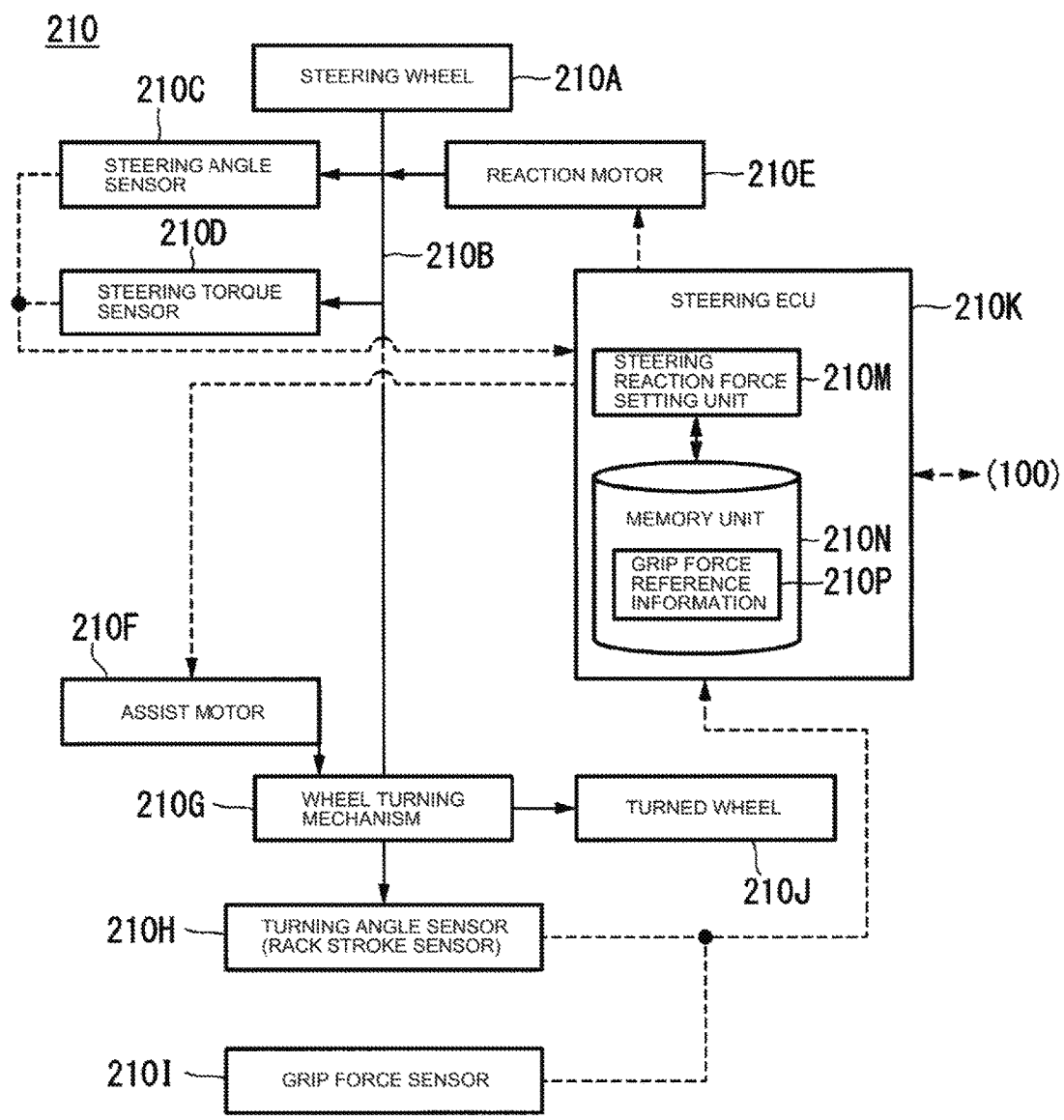
FIG. 3 is a diagram illustrating a configuration example of a steering system 210 according to this embodiment.

FIG. 3 is a diagram illustrating a configuration example of the steering system 210 according to this embodiment. The steering system 210 may include: a steering wheel 210A; a steering shaft 210B; a steering angle sensor 210C; a steering torque sensor 210D; a reaction motor 210E; an assist motor 210F; a wheel turning mechanism 210G; a turning angle sensor 210H; a grip force sensor 210I; turned wheels 210J; and a steering ECU 210K, but its constituents are not limited to these. In addition, the steering ECU 210K has a steering reaction force setting unit 210M and a memory unit 210N.

The steering wheel 210A is an example of an operation device for accepting steering instructions from the vehicle occupant. An operation made on the steering wheel 210A is transmitted to the steering shaft 210B. The steering angle sensor 210C and the steering torque sensor 210D are attached to the steering shaft 210B. The steering angle sensor 210C is configured to detect the steering angle of the steering wheel 210A and output it to the steering ECU 210K. The steering torque sensor 210D is configured to detect a torque (steering torque) acting on the steering shaft 210B and output it to the steering ECU 210K. The reaction motor 210E is configured to output a torque to the steering shaft 210B under control of the steering ECU 210K and thereby output a steering reaction force to the steering wheel 210A. Specifically, in the automated driving mode, the reaction motor 210E applies a predetermined steering reaction force for keeping steering in the automated driving, on the steering shaft 210B under control of the steering ECU 210K.

The assist motor 210F is configured to output a torque to the wheel turning mechanism 210G under control of the steering ECU 210K and thereby assist in turning the wheels. The wheel turning mechanism 210G is a rack and pinion mechanism, for example. The turning angle sensor 210H is configured to detect an amount indicative of an angle (turning angle) by which the wheel turning mechanism 210G drives the turned wheels 210J to turn (e.g. rack stroke), and output it to the steering ECU 210K. The steering shaft 210B and the wheel turning mechanism 210G may be fixedly coupled together, or may be separated from each other, or may be coupled together via a clutch mechanism. The steering system may be an electronic-power-steering (EPS) system or a steer-by-wire (SBW) system.

The grip force sensor 210I is a pressure sensor disposed at a predetermined position in a rim part of the steering wheel 210A, and configured to measure a pressure (hereinafter also referred to as a grip force) applied on a rim of the steering wheel 210A when the vehicle occupant grips the rim. The grip force sensor 210I outputs the grip force thus measured to the steering ECU 210K.

The steering ECU 210K performs the various kinds of control described above in concert with the vehicle control system 100. The steering ECU 210K may be a computer device provided separately from the vehicle control system 100, or may be a computer device integrated with the vehicle control system.

Every time the steering ECU 210K reads the grip force, output from the grip force sensor 210I, for every predetermined cycle, the steering reaction force setting unit 210M refers to grip force reference information 210P, stored in the memory unit 210N of the steering ECU 210K, based on the grip force thus read. The grip force reference information 210P is configured as a grip force table indicative of the correspondence between the grip force and the steering reaction force. The steering reaction force setting unit 210M reads, from the grip force table being the grip force reference information 210P stored in the memory unit 210N, the steering reaction force corresponding to the grip force thus fed. Further, based on the value that the steering reaction force setting unit 210M has read from the memory unit 210N, the steering ECU 210K drives the reaction motor 210E to apply the steering shaft 210B with the steering reaction force equivalent to this value.

Here, in the grip force table, the correspondence between the grip force and the steering reaction force is set so that the steering reaction force decreases as the grip force increases. Specifically, when the vehicle occupant intends to change the mode from the automated driving mode to the manual driving mode, the vehicle occupant tries to steer the steering wheel by himself/herself, and thus the vehicle occupant grips the rim of the steering wheel 210A with a grip force larger than that in the automated driving mode. For this reason, the steering reaction force setting unit 210M performs control to reduce the steering reaction force as the grip force applied on the rim increases. On the other hand, when the vehicle occupant intends to keep the automated driving mode, the vehicle occupant has no intention to actively steer the steering wheel 210A, and thus the grip force is weaker than that in the case of changing the mode to the manual driving mode. In other words, when the grip force in the automated driving mode is compared with the steering grip force in the manual driving mode, the steering grip force in the manual driving mode is larger than the grip force in the automated driving mode in proportion to the occupant's intention to drive the steering wheel by himself/herself. This embodiment makes use of the characteristics of the difference in the grip force, applied on the rim of the steering wheel 210A by the vehicle occupant, between these driving modes. Although this embodiment has a configuration in which the steering ECU 210K in the steering system 210 includes the steering reaction force setting unit 210M and the memory unit 210N, the invention is not limited to this. Instead, these units may be included in the steering system 210, or may be included in the vehicle control device 100.

In addition, as another configuration example of this embodiment, the grip force reference information 210P may be a grip force threshold used for comparing the grip force. In this case, when the steering ECU 210K reads a grip force, the steering reaction force setting unit 210M refers to the grip force reference information 210P in the memory unit 210N in response to reading of the grip force. Then, the steering reaction force setting unit 210M judges whether or not the read grip force exceeds the grip force threshold indicated by the grip force reference information 210P. In this event, if the read grip force exceeds the grip force threshold, the steering reaction force setting unit 210M outputs a control signal for shifting the steering reaction force from a first steering reaction force to a second steering reaction force. Upon output of this control signal, the steering ECU 210K drives the reaction motor 210E to shift the steering reaction force from the first steering reaction force to the second steering reaction force, and outputs, to an HMI controller 170, a steering reaction force change signal indicating this shift.

On the other hand, if the fed grip force does not exceed the grip force threshold, the steering reaction force setting unit 210M outputs a control signal for setting the first steering reaction force as the steering reaction force. In other words, the steering ECU 210K drives the reaction motor 210E to keep the steering reaction force at the value of the first steering reaction force.

Here, the first steering reaction force is set, for example, at such a high value that the steering angle of the steering wheel 210A would not be changed when the vehicle occupant merely touches the steering wheel 210A unwittingly. In other words, the first steering reaction force is set at a magnitude large enough to inhibit the steering angle manipulated variable, input when the vehicle occupant unwittingly touches the steering wheel 210A, from exceeding a threshold for change from the automated driving mode to the manual driving mode (steering angle threshold).

On the other hand, the second steering reaction force is set at a smaller value than that of the first steering reaction force, and is set at a value of a magnitude which allows the steering wheel to be steered with the manipulated variable readily exceeding the override threshold for the steering angle. In other words, the second steering reaction force is set at a magnitude that makes it easy to shift the mode from the automated driving mode to the manual driving mode and enables the vehicle occupant to steer the steering wheel 210A easily and thus steer the vehicle naturally in the manual driving mode.

The first steering reaction force and the second steering reaction force are set, for example, in such a way that multiple different vehicle occupants as testers decide, by majority vote, the steering reaction forces in the automated driving mode and the manual driving mode suitable in terms of the ease of operation for the vehicle occupants.

In addition, steering torque is used as the manipulated variable used for judging whether to switch the driving mode from the automated driving mode to the manual driving mode. For this reason, the override threshold for the steering torque is set at a value sufficiently larger than that of torque applied on the steering shaft 210B when the vehicle occupant touches the steering wheel 210A unwittingly in the automated driving mode (first steering reaction force).

With the above configuration, the steering reaction force to be applied on the steering wheel 210A is changed according to the grip force (grip state) with which the vehicle occupant grips the rim of the steering wheel 210A in the automated driving mode. This makes it easier to perform control to shift the driving mode from the automated driving mode to the manual driving mode according to the steering angle manipulated variable of the steering wheel 210A than ever before.

In addition, the above configuration uses the two steering reaction forces including the first steering reaction force and the second steering reaction force weaker than the first steering reaction force. This makes it possible to set the first steering reaction force in the automated driving mode strong enough to prevent the steering angle from being changed easily even when the vehicle occupant touches the steering wheel 210A by mistake, and thereby prevent a situation where the operation of the vehicle occupant is judged as override even though the vehicle occupant has no intention of override.

In addition, the embodiment may have a configuration in which the steering reaction force setting unit 210M has a function of studying the grip force threshold. In this case, the steering reaction force setting unit 210M accumulates grip forces that the steering ECU 210K reads from the grip force sensor 210I in the automated driving mode and the manual driving mode. Then, the steering reaction force setting unit 210M calculates the average value of the grip forces read in the automated driving mode and the average value of the grip forces read in the manual driving mode, and sets the median of these average values as the grip force threshold. The steering reaction force setting unit 210M then overwrites the grip force reference information 210P in the memory unit 210N with the grip force threshold newly calculated. In this manner, the steering reaction force setting unit 210M studies the grip force reference information 210P.

Here, this embodiment may have a configuration in which a study of the grip force threshold is carried out for each of different vehicle occupants driving the subject vehicle M, and the grip force threshold is updated for every occupant identification information for identifying the vehicle occupant. In the case of this configuration, when starting driving the vehicle, the vehicle occupant first inputs an identification information for identifying an individual through identification (ID) data input processing or read processing in fingerprint authentication, and then steers the steering wheel 210A in the subject vehicle M.

Further, as another configuration, multiple electrostatic detection sensors arranged on the rim of the steering wheel 210A at predetermined intervals may be used as grip position detection sensors for detecting the grip position. With this configuration, the electrostatic detection sensors acquire the grip position indicating which position on the rim of the steering wheel 210A the vehicle occupant grips in each of the automated driving mode and the manual driving mode. Thereby, the steering reaction force setting unit 210M acquires the grip force and the grip position read by the steering ECU 210K in each of the automated driving mode and the manual driving mode, and makes a comparison between the grip position and a reference grip position in addition to the comparison between the grip force and the grip force threshold. By doing so, it is possible to judge more precisely how much the vehicle occupant intends to shift the mode to the manual driving mode and actively drive the subject vehicle M. The reference grip position indicates a previously set grip position on the rim of the steering wheel 210A where the vehicle occupant would grip during the manual driving mode. At this time, the grip force reference information 210P in the memory unit 210N includes information on the grip force threshold and the reference grip position.

The steering reaction force setting unit 210M refers to the grip force reference information 210P in the memory unit 210N every time the steering ECU 210K reads the grip force information and the grip position in the automated driving mode.

Then, the steering reaction force setting unit 210M judges whether or not the read grip force exceeds the grip force threshold and the read grip position is located at the same position or a similar position (vicinity) of the reference grip position. In this event, the steering reaction force setting unit 210M outputs a control signal for changing the steering reaction force from the first steering reaction force to the second steering reaction force if the read grip force exceeds the grip force threshold and the read grip position is located at the same or similar position as the reference grip position. Upon output of this control signal, the steering ECU 210K drives the reaction motor 210E to shift the steering reaction force from the first steering reaction force to the second steering reaction force. On the other hand, the steering reaction force setting unit 210M keeps unchanged the steering reaction force at the first steering reaction force if the read grip force does not exceed the grip force threshold or if the read grip position is not located at the same or similar position as the reference grip position. Here, the similar position indicates a position that falls within a predetermined tolerance range (similarity range) set in the circumferential direction of the steering wheel 210A around the reference grip position of the steering wheel 210A.

The steering reaction force setting unit 210M also has a function of studying the grip position in addition to the grip force study function described above. The steering reaction force setting unit 210M studies the grip position in each of the automated driving mode and the manual driving mode every time the steering ECU 210K reads the measurement values of the respective electrostatic detection sensors. In this event, the steering reaction force setting unit 210M accumulates grip positions, read by the steering ECU 210K, where the vehicle occupant grips on the rim of the steering wheel 210A in the automated driving mode and the manual driving mode. Then, the steering reaction force setting unit obtains the reference grip position which is a grip position where the vehicle occupant is most likely to grip in each of the automated driving mode and the manual driving mode. The steering reaction force setting unit 210M studies the grip force reference information 210P in the memory unit 210N by updating the grip force reference information 210P with the newly obtained reference grip position in the manual driving mode.

Meanwhile, instead of arranging the electrostatic detection sensors on the rim of the steering wheel 210A as described above, the embodiment may have a configuration in which grip force sensors 210I are arranged at multiple different positions on the rim of the steering wheel at predetermined intervals. This configuration makes it possible to detect which position's grip force sensor 210I is being gripped based on grip force information from the grip force sensors 210I, and thereby acquire the grip force and the grip position from the grip force sensors 210I at the same time.

Meanwhile, the configuration described in another configuration example described above is one in which control on the steering reaction force is performed when the grip force exceeds the grip force threshold and the grip position is located at the same or similar position as the reference grip position. However, it is also possible to perform control to shift the steering reaction force from the first steering reaction force to the second steering reaction force if the grip force exceeds the grip force threshold or the grip position is located at the same or similar position as the reference grip position.

Alternatively, the steering reaction force setting unit 210M may be configured to control the steering reaction force based on only the grip position. Specifically, the steering reaction force setting unit 210M performs control to shift the steering reaction force from the first steering reaction force to the second steering reaction force if the grip position read by the steering ECU 210K is located at the same or similar position as the reference grip position.

The brake system 220 is an electric servo brake system including, for example: a brake caliper; a cylinder designed to transmit hydraulic pressure to the brake caliper; an electric motor configured to generate hydraulic pressure in the cylinder; and a braking controller. The braking controller of the electric servo brake system is configured to control an electric motor according to information input from the travel controller 160 so that brake torque corresponding to braking operation can be output to each wheel. The electric servo brake system may include, as its backup, a mechanism configured to transmit hydraulic pressure, generated in response to operation on the brake pedal, to the cylinder through a master cylinder. Here, the brake system 220 is not limited to the electric servo brake system described above but may be an electronically controlled hydraulic brake system. The electronically controlled hydraulic brake system is configured to control an actuator according to information input from the travel controller 160 and transmit the hydraulic pressure of the master cylinder to the cylinder. In addition, the brake system 220 may include a regenerative brake, operated by the driving motor, which can be included in the driving force output system 200.

[Vehicle Control System]

Hereinbelow, the vehicle control system 100 is described. The vehicle control system 100 is implemented, for example, by one or more processors or hardware having the equivalent function. The vehicle control system 100 may have a configuration where an Electronic Control Unit (ECU) or a Micro-Processing Unit (MPU), made by connecting a processor such as a Central processing Unit (CPU), a memory, and a communication interface are connected to one another through internal buses, and the like are combined together.

Referring back to FIG. 2, the vehicle control system 100 includes, for example: the target lane determination unit 110; an automated driving controller 120; the travel controller 160; the human machine interface (HMI) controller 170; and a memory unit 180. The automated driving controller 120 includes, for example: an automated driving mode controller 130; a subject-vehicle position recognition unit 140; an outside recognition unit 142; an action plan creation unit 144; a trajectory creation unit 146; and a switching controller 150. The target lane determination unit 110, the units of the automated driving controller 120, and a part or all of the travel controller 160 and the HMI controller 170 are implemented by causing a processor to execute a program (software). Alternatively, these units may be partially or entirely implemented by hardware such as a Large Scale Integration (LSI) or Application Specific Integrated Circuit (ASIC), or may be implemented by a combination of software and hardware.

For example, information such as high-accuracy map information 182, target lane information 184, action plan information 186 is stored in the memory unit 180. The memory unit 180 is implemented by a Read Only Memory (ROM), a Random Access Memory (RAM), a Hard Disk Drive (HDD), a flash memory, and the like. The program executed by the processor may be stored in the memory unit 180 in advance, or instead may be downloaded from an external device via an in-vehicle internet facility for example. Alternatively, the program may be installed in the memory unit 180 by attaching a portable storage medium storing the program therein to a drive device (not illustrated). Further, the vehicle control system 100 may be implemented by multiple distributed computer devices.

The target lane determination unit 110 is implemented by an MPU, for example. The target lane determination unit 110 is configured to divide a route provided by the navigation system 50 into multiple blocks (divide the route at an interval of 100 [m] in a vehicle travel direction, for example), and determine a target lane for each block with reference to the high-accuracy map information 182. For example, the target lane determination unit 110 determines which lane from the left the subject vehicle will travel. In the case where there is a branching point, a merging point, or the like on the route, for example, the target lane determination unit 110 determines the target lane so that the subject vehicle M can travel on a travel route reasonable for advancing toward its branching destination. The target lane thus determined by the target lane determination unit 110 is stored in the memory unit 180 as the target lane information 184.

The high-accuracy map information 182 is map information more accurate than navigation map included in the navigation system 50. The high-accuracy map information 182 includes, for example, information on the center of a lane or information on a boundary between lanes. The high-accuracy map information 182 may also include information such as road information, traffic regulation information, address information (address and zip code), facility information, and phone number information. The road information includes information on the type of the road such as an expressway, a toll road, a national road, and a prefectural road, and information on the number of lanes of the road, the width of each lane, the inclination of the road, the position of the road (three-dimensional coordinates including the longitude, latitude, and height), the curvature of the curve of each lane, the positions of the merging point and branching point of the lanes, signs on the road, and the like. The traffic regulation information includes information on the fact that the lanes are being closed due to reasons such as construction work, traffic accident, or traffic congestion.

The automated driving mode controller 130 is configured to determine the automated driving mode to be executed by the automated driving controller 120. The automated driving mode in this embodiment includes the following modes. Note that the following modes are merely exemplary, and the number of automated driving modes may be determined as desired.

[Mode A]

Mode A is a mode with the highest automated driving level. When mode A is in operation, all kinds of vehicle control including complicated merging control are performed automatically, and thus the vehicle occupant does not need to monitor the periphery and state of the subject vehicle M.

[Mode B]

Mode B is a mode with the second highest automated driving level next to mode A. When mode B is in operation, all kinds of vehicle control are performed automatically in principle, but in some cases the driving operation of the subject vehicle M is left to the vehicle occupant. Hence, the vehicle occupant needs to monitor the periphery and state of the subject vehicle M.

[Mode C]

Mode C is a mode with the third highest automated driving level next to mode B. When mode C is in operation, the vehicle occupant needs to perform a check operation depending on the situation on each of the constituents of the driving operation system (human machine interface (HMI)) including the acceleration pedal 70, the brake pedal 80, and the steering wheel 210A. In mode C, automatic lane change is performed, for example, when the vehicle occupant is notified of the lane change timing and performs an operation of lane change instructions on the steering wheel 210A. Hence, the vehicle occupant needs to monitor the periphery and state of the subject vehicle M.

The automated driving mode controller 130 determines the automated driving mode based on operation made by the vehicle occupant on each of the constituents of the driving operation system, the event determined by the action plan creation unit 144, and the travel mode determined by the trajectory creation unit 146, for example. The HMI controller 170 is notified of this automated driving mode. In addition, a limitation may be set for the automated driving mode according to the performance of the detection device DD of the subject vehicle M, for example. When the performance of the detection device DD is poor, for example, mode A may be set inactive. In either mode, switching to the manual driving mode (override) is possible by operation on the configuration of the driving operation system in each of the constituents of the driving operation system.

The subject-vehicle position recognition unit 140 of the automated driving controller 120 is configured to recognize the lane the subject vehicle M is traveling (travel lane) and the position of the subject vehicle M relative to the travel lane based on the high-accuracy map information 182 stored in the memory unit 180 and the information input from the finders 20, the radars 30, the camera 40, the navigation system 50, or the vehicle sensor 60.

The subject-vehicle position recognition unit 140 recognizes the travel lane by, for example, comparing a pattern of road compartment lines (e.g., an array of solid lines and broken lines) that can be recognized from the high-accuracy map information 182 with a pattern of road compartment lines in the periphery of the subject vehicle M that can be recognized from images taken by the camera 40. Here, the position of the subject vehicle M acquired from the navigation system 50 and a process result of the INS may also be taken into consideration for this recognition.

The travel controller 160 is configured to control the driving force output system 200, the steering system 210, and the brake system 220 so that the subject vehicle M can pass through the trajectory, created by the trajectory creation unit 146, on schedule.

The HMI controller 170 is configured to display videos and images on the display device 91 and output audio through the speaker 92.

Figure 4:
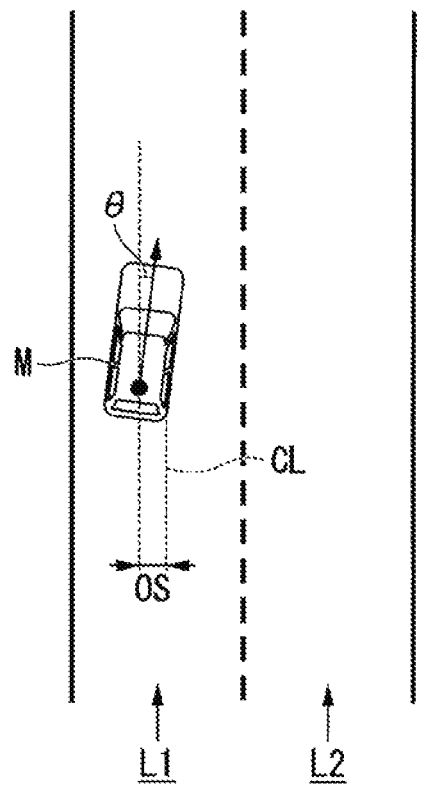
FIG. 4 is a view illustrating how the position of the subject vehicle M relative to a travel lane L1 is recognized by a subject-vehicle position recognition unit 140.

FIG. 4 is a view illustrating how the position of the subject vehicle M relative to a travel lane L1 is recognized by the subject-vehicle position recognition unit 140. For example, the subject-vehicle position recognition unit 140 recognizes parameters, such as a divergence OS of a reference point of the subject vehicle M (such as the center of gravity) from a travel lane center CL and an angle θ between the travel direction of the subject vehicle M and the travel lane center CL, as the position of the subject vehicle M relative to the travel lane L1. Here, the subject-vehicle position recognition unit 140 may instead recognize parameters, such as the position of the reference point of the subject vehicle M relative to any one of side end parts of the travel lane L1, as the position of the subject vehicle M relative to the travel lane. The relative position of the subject vehicle M recognized by the subject-vehicle position recognition unit 140 is provided to the target lane determination unit 110.

The outside recognition unit 142 is configured to recognize the state of a peripheral vehicle, such as the position, velocity, and acceleration thereof, based on information input from the finders 20, the radars 30, the camera 40, and the like. The peripheral vehicle is a vehicle traveling at the periphery of the subject vehicle M and traveling in the same direction as the subject vehicle M. The position of the peripheral vehicle may be indicated by representative points such as the center of gravity and corners of this vehicle, or alternatively may be indicated by an area represented by the outline of this vehicle. The "state" of the peripheral vehicle may include the acceleration of the peripheral vehicle and whether or not the peripheral vehicle is changing lanes (or whether or not the peripheral vehicle is going to change lanes) that can be kept track of based on information from the above instruments. In addition to the peripheral vehicle, the outside recognition unit 142 may also recognize the positions of a guard rail, a power pole, a parked vehicle, a pedestrian, and other objects.

The action plan creation unit 144 is configured to set a start point of automated driving and/or a destination of automated driving. The start point of automated driving may be a current position of the subject vehicle M or alternatively may be a point where an operation of automated driving instruction is made. The action plan creation unit 144 is configured to create an action plan in a section between the start point and the destination of automated driving. Here, in addition to the above section, the action plan creation unit 144 may create an action plan in any section.

The action plan is composed of multiple events executed in series, for example. The events include, for example: a deceleration event for decelerating the subject vehicle M; an acceleration event for accelerating the subject vehicle M; a lane keeping event for letting the subject vehicle M travel inside the travel lane; a lane change event for changing the travel lane; a passing event for letting the subject vehicle M pass a vehicle traveling in front of it; a branching event for letting the subject vehicle M change the lane to a desired lane or travel inside the current travel lane at a branching point; a merging event for letting the subject vehicle M accelerate and change the travel lane in a merging lane for merging with a main lane; and a handover event for letting the vehicle transition from the automated driving mode to the manual driving mode at a planned automated driving end point. The action plan creation unit 144 sets the lane change event, the branching event, or the merging event at a location where the target lane determined by the target lane determination unit 110 is switched. Information indicating the action plan created by the action plan creation unit 144 is stored in the memory unit 180 as the action plan information 186.

Figure 5:
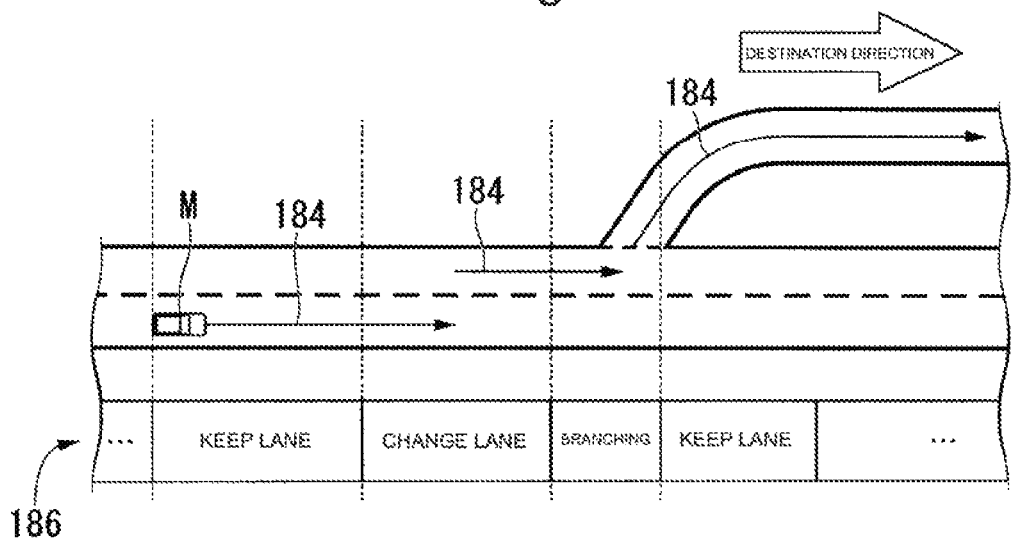
FIG. 5 is a view illustrating an example of an action plan created for a certain zone.

FIG. 5 is a view illustrating an example of an action plan created for a certain zone. As illustrated in the drawing, the action plan creation unit 144 creates an action plan required for the subject vehicle M to travel on the target lane designated by the target lane information 184. Here, the action plan creation unit 144 may dynamically change the action plan irrespectively of the target lane information 184 according to the change of situation of the subject vehicle M. For example, when the velocity of a peripheral vehicle recognized by the outside recognition unit 142 during travel of the vehicle exceeds a threshold or when the movement direction of a peripheral vehicle traveling on a lane next to the lane of the subject vehicle M is changed toward the lane of the subject vehicle, the action plan creation unit 144 changes the event set for a driving section the subject vehicle is scheduled to travel. For example, when event setting is made so that the lane change event is executed after the lane keeping event and if it turns out from a recognition result of the outside recognition unit 142 that a vehicle on the change destination lane is approaching from behind at a velocity equal to or higher than a threshold during the lane keeping event, the action plan creation unit 144 may change the event coming after the lane keeping event from the lane change event to another event such as the deceleration event or the lane keeping event. Thereby, the vehicle control system 100 can make the subject vehicle M automatically travel safely even when there is a change in outside situation.

Figure 6:
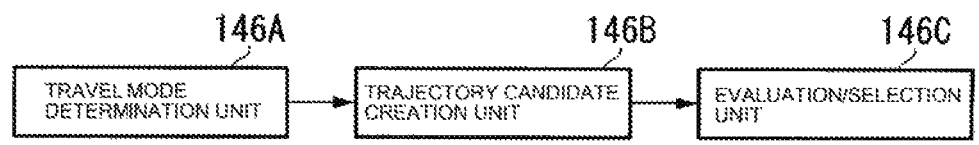
FIG. 6 is a diagram illustrating an example of the configuration of a trajectory creation unit 146.

FIG. 6 is a diagram illustrating an example of the configuration of the trajectory creation unit 146. For example, the trajectory creation unit 146 includes: a travel mode determination unit 146A; a trajectory candidate creation unit 146B; and an evaluation/selection unit 146C.

The travel mode determination unit 146A is configured to determine, when executing the lane keeping event for example, the travel mode among modes such as constant-velocity travel, tracking travel, low-velocity tracking travel, deceleration travel, curve travel, and obstacle avoidance travel. In this event, when no other vehicle exists in front of the subject vehicle M, the travel mode determination unit 146A determines to set the travel mode to the constant-velocity travel. Meanwhile, when the subject vehicle tracks a vehicle traveling in front of it, the travel mode determination unit 146A determines to set the travel mode to the tracking travel. Meanwhile, in the case of situations such as traffic congestion, the travel mode determination unit 146A determines to set the travel mode to the low-velocity tracking travel. Meanwhile, when deceleration of a vehicle traveling in front of the subject vehicle is recognized by the outside recognition unit 142 or when the subject vehicle executes an event such as the stopping or parking of the vehicle, the travel mode determination unit 146A determines to set the travel mode to the deceleration travel. Meanwhile, when an event that the subject vehicle M approaches a curve is recognized by the outside recognition unit 142, the travel mode determination unit 146A determines to set the travel mode to the curve travel. Meanwhile, when an obstacle in front of the subject vehicle M is recognized by the outside recognition unit 142, the travel mode determination unit 146A determines to set the travel mode to the obstacle avoidance travel. In addition, when the event such as the lane change event, the passing event, the branching event, the merging event, or the handover event is carried out, the travel mode determination unit 146A determines the travel mode suitable for this event.

Figure 7:
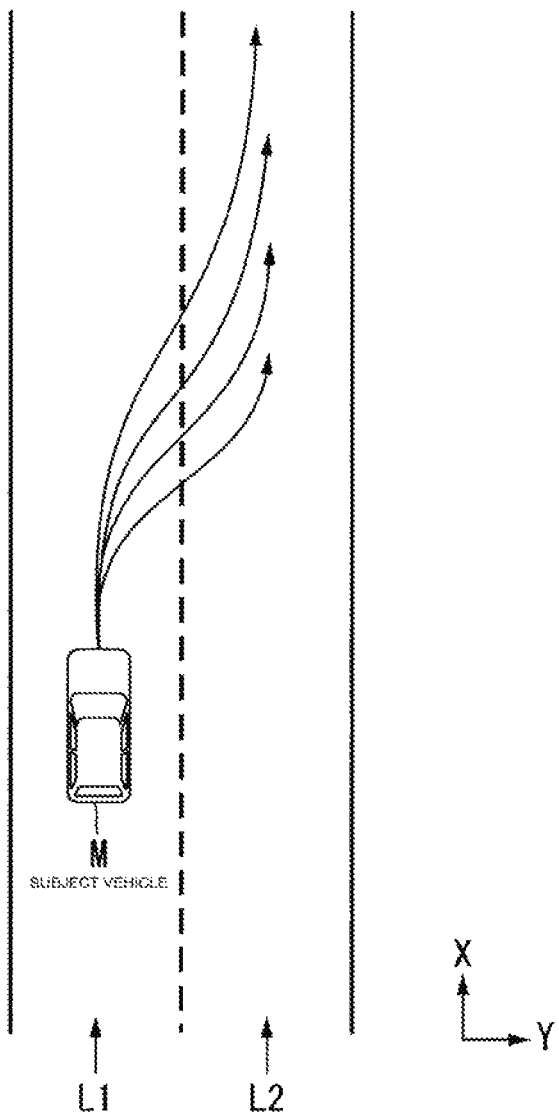
FIG. 7 is a view illustrating an example of trajectory candidates created by a trajectory candidate creation unit 146B.

The trajectory candidate creation unit 146B is configured to create trajectory candidates based on the travel mode determined by the travel mode determination unit 146A. FIG. 7 is a view illustrating an example of the trajectory candidates created by the trajectory candidate creation unit 146B. FIG. 7 illustrates the trajectory candidates created when the subject vehicle M changes lanes from L1 to L2.

The trajectory candidate creation unit 146B determines trajectories as illustrated in FIG. 7 for every predetermined time interval as a group of target positions (trajectory points K) at which a reference position of the subject vehicle M (such as the center of gravity or the center of the axis of rear wheels) should arrive. FIG. 8 is a view illustrating, with the trajectory points K, the trajectory candidates created by the trajectory candidate creation unit 146B. The velocity of the subject vehicle M increases as the interval between the trajectory points K becomes wider, and decreases as the interval between the trajectory points K becomes narrower. Thus, the trajectory candidate creation unit 146B widens the interval between the trajectory points K gradually in the case of acceleration, and narrows the interval between the trajectory points gradually in the case of deceleration.

Since each trajectory point K includes a component of velocity, the trajectory candidate creation unit 146B needs to provide each trajectory point K with a target velocity. The target velocity is determined by the travel mode determination unit 146A according to the travel mode.

Here, a target velocity determination method in the case of lane change (including branching) is described. First, the trajectory candidate creation unit 146B sets a lane change target position (or a merging target position). The lane change target position is set as a position relative to peripheral vehicles, and is used to determine "between which peripheral vehicles the subject vehicle is to cut in when changing lanes". The trajectory candidate creation unit 146B focuses attention on three peripheral vehicles located around the lane change target position, and determines the target velocity in the case of lane change. FIG. 9 is a view illustrating a lane change target position TA. In the drawing, reference numeral L1 denotes the lane of the subject vehicle and reference numeral L2 denotes a lane next to the lane of the subject vehicle. Here, a preceding vehicle mA is defined as a peripheral vehicle traveling on the same lane as the subject vehicle M and immediately in front of the subject vehicle M, a front reference vehicle mB is defined as a peripheral vehicle traveling immediately in front of the lane change target position TA, and a rear reference vehicle mC is defined as a peripheral vehicle traveling immediately behind the lane change target position TA. The subject vehicle M needs to accelerate or decelerate to move to the side of the lane change target position TA, but at the same time needs to avoid catching up with the preceding vehicle mA. For this reason, the trajectory candidate creation unit 146B estimates the future state of the three vehicles and determines the target velocity so as not to interfere with the peripheral vehicles.

FIG. 10 is a view illustrating a velocity model created based on the assumption that the velocities of the three peripheral vehicles are constant. In the drawing, straight lines extending from mA, mB, and mC represent their displacements in the travel direction when it is assumed that the peripheral vehicles travel at constant velocities. The subject vehicle M has to be located between the front reference vehicle mB and the rear reference vehicle mC at a lane change completion point CP, and at the same time has to be located behind the preceding vehicle mA before this point. Under such restrictions, the trajectory candidate creation unit 146B derives multiple chronological patterns of target velocities in a period until completion of the lane change. Then, the trajectory candidate creation unit derives multiple trajectory candidates as illustrated in FIG. 8 above by applying the chronological target velocity patterns to a model such as a spline curve model. Here, the movement patterns of the three peripheral vehicles do not necessarily have to be a constant-velocity pattern as illustrated in FIG. 10, but may be estimated based on constant acceleration or constant jerk.

The evaluation/selection unit 146C is configured to evaluate the trajectory candidates, created by the trajectory candidate creation unit 146B, in terms of two perspectives i.e. planning and safety, for example, and select a trajectory to be output to the travel controller 160. In terms of planning, a trajectory with good evaluation is one which has high trackability with respect to the already created plan (such as the action plan) and whose entire length is short, for example. For example, when lane change to the right is requested, a trajectory such as changing lanes to the left once and then going back results in poor evaluation. In terms of safety, better evaluation is given to a trajectory in which the distance between the subject vehicle M and an object (such as a peripheral vehicle) is larger at every trajectory point and whose acceleration/deceleration, amount of variation of steering angle, and the like are smaller.

The switching controller 150 is configured to switch the mode between the automated driving mode and the manual driving mode based on a signal input through the automated driving switchover switch 93. In addition, the switching controller 150 is configured to switch the mode from the automated driving mode to the manual driving mode based on an acceleration, deceleration, or steering instruction operation given to the acceleration pedal 70, the brake pedal 80, or the steering wheel 210A. For example, the switching controller 150 switches the mode from the automated driving mode to the manual driving mode (override) if the manipulated variable(s) indicated by a signal(s) input from any of, a combination of more than one of, or all of the throttle opening sensor 71, the brake depressing amount sensor 81, the steering angle sensor 210C, and the steering torque sensor 210D exceed(s) the override threshold(s). Here, the override threshold is a threshold for the manipulated variable over which override control of switching the mode from the automated driving mode to the manual driving mode is performed. In addition, after switching to the manual driving mode due to override, the switching controller 150 may switch the mode back to the automated driving mode if no operation on the configuration of the driving operation system including the acceleration pedal 70, the brake pedal 80, and the steering wheel 210A is detected for a predetermined period of time.

When switching the driving mode from the automated driving mode to the manual driving mode based on an acceleration, deceleration, or steering instruction operation given to the operation device, the switching controller 150 switches the driving mode from the automated driving mode to the manual driving mode if the manipulated variable (such as a variation in the steering angle, the throttle opening, the amount of brake depression, or the steering torque) is equal to or larger than the override threshold, as described above.

The HMI controller 170 displays, on a display screen 300 of the display device 91 for example, the relative relationship between the values of the current manipulated variable and the override threshold corresponding to this manipulated variable.

FIG. 11 is a chart illustrating comparison between the current manipulated variable and the override threshold corresponding to this manipulated variable which is displayed on the display screen 300 of the display device 91. In the following description of FIG. 11, the angle by which the steering wheel 210A is steered (steering angle) detected by the steering angle sensor 210C and the amount of depression on the brake pedal 80 (brake depressing amount) detected by the brake depressing amount sensor 81 are used as an example of the manipulated variable. The processing of displaying images on the display screen 300 of the display device 91 illustrated in FIG. 11 is executed by the HMI controller 170.

Text information 301 and an image 302 regarding the steering angle and text information 303 and an image 304 regarding the amount of brake depression are displayed on the display screen 300 of the display device 91. For example, when the vehicle occupant operates multiple operators such as the steering wheel 210A and the brake pedal 80, information on these operations are displayed on the display screen 300. Meanwhile, operators such as the acceleration pedal 70 that are not being operated by the vehicle occupant do not necessarily have to be displayed, as illustrated in FIG. 11.

The HMI controller 170 displays current manipulated variables 302A and 304A and the corresponding override thresholds in the images 302 and 304. In addition, in the example of FIG. 11, while the fixed state (neutral position) of each of the steering wheel 210A and the brake pedal 80 in the automated driving mode is set at "0", the HMI controller displays the manipulated variables by which the vehicle occupant has operated them from their neutral states. However, the invention is not limited to this. If the positions of the steering wheel 210A and the brake pedal 80 are moved in the automated driving mode, it is also possible to set the moved positions as the neutral positions. By watching the text information 301 and 303 and the images 302 and 304 displayed on the display screen 300, the vehicle occupant can clearly know how much is left until the mode is shifted (switched) from the automated driving mode to the manual driving mode due to override.

In FIG. 11, as illustrated in the image 302, the steering angle which is the manipulated variable of the steering wheel 210A is changed as appropriate depending on the situation under which the vehicle occupant operates the steering wheel 210A. The override threshold to be compared with the steering angle is displayed on the display screen 300 of the display device 91 with a dotted line. In addition, a text image indicating that this is the steering angle as the override threshold is displayed on the display screen. If the steering angle exceeds the override threshold, the switching controller 150 performs processing of changing the driving mode from the automated driving mode to the manual driving mode.

Here, when the steering reaction force is changed adaptively, the vehicle occupant cannot understand the causal relationship, i.e., whether or not this change in the steering reaction force is because he/she has strengthened the grip force for gripping the steering wheel 210A. In this case, unless there is no notice informing him/her of the fact that some sort of change has occurred, the vehicle occupant feels strange about why the steering reaction force has been reduced, i.e., why the steering wheel 210A becomes easy to steer.

However, irrespective of what has reduced the steering reaction force, by watching the images of FIG. 11 on the display device 91, the vehicle occupant can check in real time through the display device 91 that the mode is currently being shifted from the automated driving mode to the manual driving mode. Thereby, the vehicle occupant can understand that the steering reaction force has been reduced in response to his/her intention to change the mode from the automated driving mode to the manual driving mode, and thus can feel assured about the adaptive change of the steering reaction force.

Meanwhile, it is also possible to perform vehicle driving control processing by saving a program for implementing the function of the vehicle control system 100 in FIG. 2 in a computer-readable recording medium, loading the program saved in this recording medium in a computer system, and executing the program. Note that the "computer system" mentioned here includes hardware such as an OS and peripheral devices.

In addition, the "computer system" includes a homepage-providing environment (or displaying environment) when the WWW system is used.

Further, the "computer readable recording medium" indicates a portable medium such as a flexible disk, a magneto-optical disk, a ROM, and a CD-ROM, or a storage device such as a hard disk built into the computer system. Furthermore, the "computer readable recording medium" also includes a medium that dynamically holds a program for a short period of time, such as a communication line in the case of transmitting a program via a network such as the Internet or a communication line such as a telephone line, and a medium that holds a program for a given period of time, such as a volatile memory in a computer system serving as a server or client in the above case. The above program may be for implementing apart of the above function, or may be one capable of implementing the above function in combination with a program already saved in the computer system.

Hereinabove, the embodiment of the invention has been described in detail with reference to the drawings. However, a specific configuration of the invention is not limited to this embodiment, but may include designs and the like within a range not departing from the gist of the invention. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A vehicle control device comprising:
    a switching controller that is configured to switch a driving mode of a vehicle from an automated driving mode to a manual driving mode based on a predetermined manipulation amount of a steering wheel; and
    a steering reaction force setting controller that is configured to set, according to a gripping state in which a vehicle occupant grips said steering wheel, a steering reaction force, the steering reaction force being applied when said vehicle occupant steers said steering wheel while said automated driving mode is executed.

2. The vehicle control device according to claim 1, wherein, according to a grip force with which said vehicle occupant grips said steering wheel, said steering reaction force setting controller sets said steering reaction force applied when said vehicle occupant steers said steering wheel while said automated driving mode is executed.

3. The vehicle control device according to claim 2, wherein said steering reaction force setting controller:
    compares a predetermined first grip force threshold with said grip force, and
    changes said steering reaction force from a first steering reaction force to a second steering reaction force smaller than said first steering reaction force when said grip force exceeds said first grip force threshold.

4. The vehicle control device according to claim 3, wherein said steering reaction force setting controller determines said first grip force threshold by studying said grip force of the vehicle occupant during said manual driving mode.

5. The vehicle control device according to claim 1, wherein, according to a grip position at which said vehicle occupant grips said steering wheel, said steering reaction force setting controller sets said steering reaction force applied when said vehicle occupant steers said steering wheel while said automated driving mode is executed.

6. The vehicle control device according to claim 5, wherein said steering reaction force setting controller:
    compares a predetermined grip reference position with said grip position, and
    changes said steering reaction force from a first steering reaction force to a second steering reaction force smaller than said first steering reaction force when said grip position is located at the same position as or at a position in the vicinity of said predetermined grip reference position.

7. The vehicle control device according to claim 6, wherein said steering reaction force setting controller determines said grip reference position by studying said grip position of the vehicle occupant during said manual driving mode.

8. The vehicle control device according to claim 1, wherein the automated driving mode includes a semi-automated driving mode.

9. The vehicle control device according to claim 1, wherein the steering reaction force is a resisting force against the predetermined manipulation of the steering wheel.

10. The vehicle control device according to claim 9, wherein the steering reaction force setting controller changes the steering reaction force to a lower value, according to the gripping state, to facilitate the predetermined manipulation of the steering wheel to switch the driving mode of the vehicle from the automated driving mode to the manual driving mode.

11. The vehicle control device according to claim 1, wherein the predetermined manipulation amount is an amount of a manipulated steering angle.

12. A vehicle control method comprising:
a switching control process of causing a switching controller to switch a driving mode of a vehicle from an automated driving mode to a manual driving mode based on a predetermined manipulation amount of a steering wheel; and
a steering reaction force setting process of causing a steering reaction force setting controller to set, according to a gripping state in which a vehicle occupant grips said steering wheel, a steering reaction force, the steering reaction force being applied when said vehicle occupant steers said steering wheel while said automated driving mode is executed.

13. A non-transitory computer readable medium storing a vehicle control program causing a computer to execute processing comprising:
switching a driving mode of a vehicle from an automated driving mode to a manual driving mode based on a predetermined manipulation amount of a steering wheel; and
setting, according to a gripping state in which a vehicle occupant grips said steering wheel, a steering reaction force, the steering reaction force being applied when said vehicle occupant steers said steering wheel while said automated driving mode is executed.

* * * * *